(12) United States Patent
Gargas

(10) Patent No.: US 6,207,064 B1
(45) Date of Patent: Mar. 27, 2001

(54) OZONE CONTACT CHAMBER

(76) Inventor: Joseph Gargas, 6316 Wisteria La., Apollo Beach, FL (US) 33572

( * ) Notice: Subject to any disclaimer, the term of this patent is extended or adjusted under 35 U.S.C. 154(b) by 0 days.

(21) Appl. No.: 09/351,772

(22) Filed: Jul. 12, 1999

(51) Int. Cl.[7] .................................................. C02F 1/78
(52) U.S. Cl. ..................... 210/752; 210/746; 210/760; 210/205; 261/79.2; 261/DIG. 42
(58) Field of Search ................................. 210/721, 752, 210/746, 760, 764, 169, 192, 199, 205, 206; 261/79.2, DIG. 42, DIG. 75

(56) References Cited

U.S. PATENT DOCUMENTS

| | | | |
|---|---|---|---|
| 4,043,913 | * | 8/1977 | Hintermeister ........................ 210/169 |
| 4,141,830 | * | 2/1979 | Last ....................................... 210/760 |
| 4,614,596 | * | 9/1986 | Wyness ................................. 210/754 |
| 4,640,783 | * | 2/1987 | Kern ...................................... 210/760 |
| 5,266,215 | * | 11/1993 | Engelhard ............................. 210/748 |
| 5,266,216 | * | 11/1993 | Agueda et al. ....................... 210/760 |
| 5,397,480 | * | 3/1995 | Dickerson ............................ 210/752 |
| 5,451,318 | * | 9/1995 | Moorehead ........................ 210/512.1 |
| 5,674,312 | * | 10/1997 | Mazzei .................................... 95/261 |
| 5,709,799 | * | 1/1998 | Engelhard ............................. 210/748 |
| 5,865,995 | * | 2/1999 | Nelson .................................. 210/205 |
| 6,001,247 | * | 12/1999 | Schulz .................................. 210/192 |
| 6,054,046 | * | 4/2000 | Nelson .................................. 210/194 |

* cited by examiner

Primary Examiner—Peter A. Hruskoci
(74) Attorney, Agent, or Firm—Perdorf & Cutliff

(57) ABSTRACT

An ozone contact chamber utilizing the principle of laminar stratification of gas in a turbulent contact chamber. The contact chamber is much shorter in height than the conventional tower contact chamber, and ensures a high degree of dissolution of ozone in water and, consequently, a high degree of oxidation of organic and metal impurities to a final oxidation state.

18 Claims, 1 Drawing Sheet

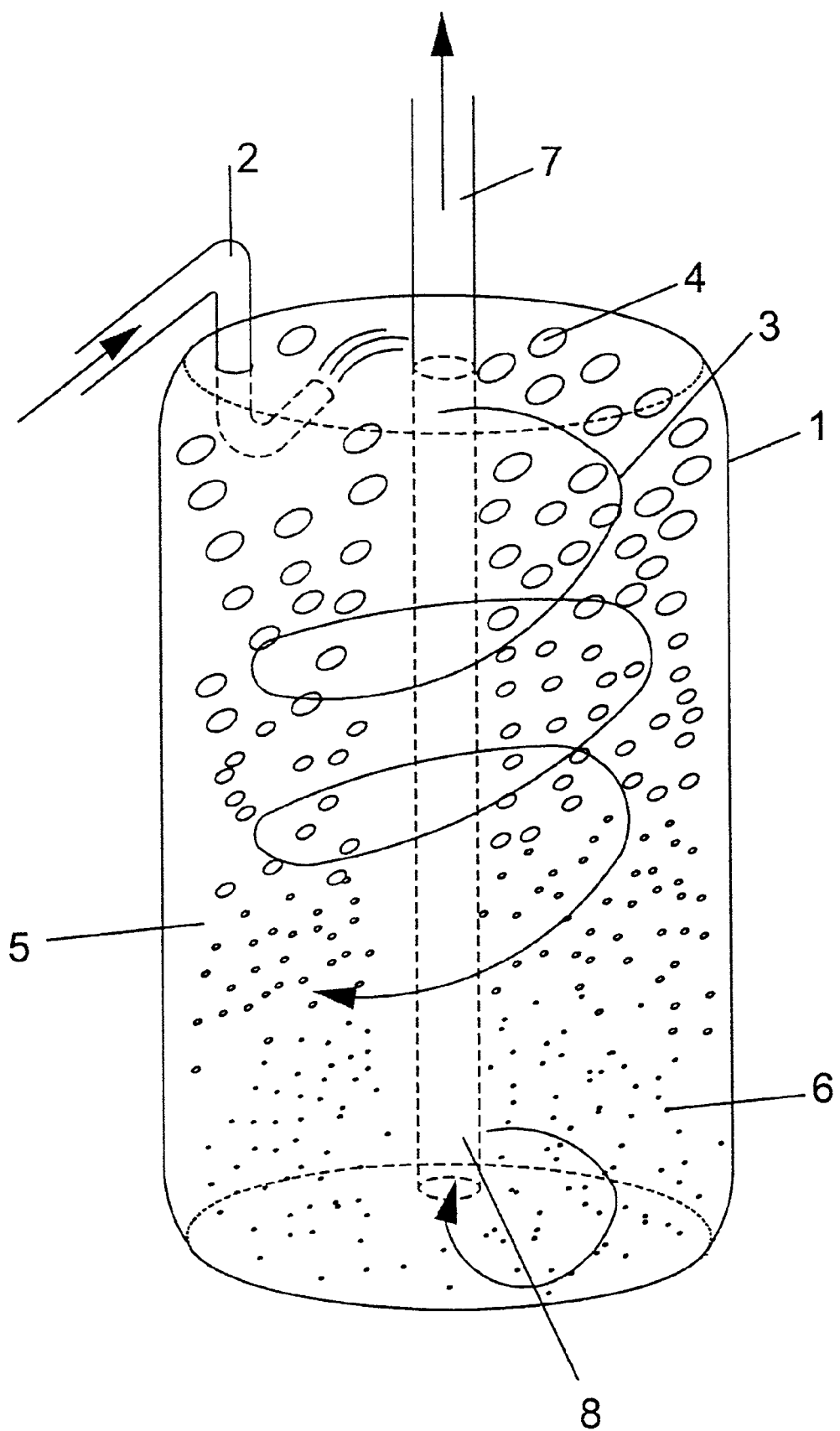

OZONE CONTACT CHAMBER

BACKGROUND OF THE INVENTION

1. Field of the Invention

The present invention concerns an ozone contact chamber utilizing the principle of laminar stratification of gas in a turbulent contact chamber. The resulting contact chamber is much shorter in height than the conventional tower contact chamber, and ensures a high degree of dissolution of ozone in water and, consequently, a high degree of oxidation of organic and metal impurities to a final oxidation state.

2. Description of the Related Art

It is known to introduce ozone into water to eliminate contaminants, in particular bacterial contaminants. Ozone has been used as a chemical treatment to oxidize organic matter, metals, bacteria, and viruses in the water being treated. Dissolved ozone also forms an oxide coating on the surface of submerged metals, preventing corrosion. An ozone molecule is a rapid oxidizer that will oxidize organic matter quickly. Oxidized organics and metals can gain electrons and assume a positive attraction for other negatively charged particles, causing them to amalgamate, forming larger clumps easily removed by a filter.

The ozonation process can be broken down into two steps: (1) production of ozone in the form of a gas, and (2) contacting water with the ozone gas for a time sufficient to achieve some degree of oxidation of organics and metals present in the water. No matter how the ozone is produced, ozonation is not effective unless the gas water interface is broken and the ozone is sufficiently dissolved within the water being treated. Thus, many attempts have been made to optimize ozone-water contact.

In conventional ozone contact chambers, the ozone gas is applied at the base of a tall column. The ozone-oxygen bubbles float to the surface slowly, their upward movement slowed by the downward counter flow of the water stream. In order to achieve a sufficient contact time for the ozone to dissolve in the water before the water and ozone pass from the mixing column, the counter-current flow mechanism is combined with a tall contact column. The column must be extremely tall and is difficult to install in ordinary sized plant equipment rooms. The concentration of dissolved ozone-oxygen is undesirably diluted in the larger vertical columns. While ozone-oxygen contact in mixing chambers is generally effective, there is a need for improved mixing in more compact sized mixing vessels.

Attempts to improve the contact particularly in conjunction with swimming pools are described in U.S. Pat. No. 4,640,783 (Kern) and U.S. Pat. No. 4,966,717 (Kern). However, these systems require much space or must be deployed inside the swimming pool itself. Further improvements are required.

Ozone generators designed specifically for use in treatment of water are also well known. However, upon closer inspection, it can be seen that each of these designs is associated with inherent disadvantages.

For example, U.S. Pat. No. 5,451,318 (Morehead) teaches a filtration system for water or other selected liquids that includes an ozone mixing station, a primary solids and gas separator and, if desired, a second vortex particle separator and filter system. The ozone mixing station includes a high efficiency ozone generator and a channel arrangement, such as a spiral tubular treatment coil, through which the ozone/liquid mixture passes to assure thorough mixing and provide time for effective treatment. In practice, it has been found that the amount of energy required to force water through a spiral tubular treatment coil, particularly in counter-current flow arrangement, results in a significant pressure drop between the water inlet and water outlet side of the coil. Further, there is room for improvement in the water-ozone contact.

U.S. Pat. No. 5,709,799 (Engelhard) simply teaches bubbling ozone through a short tank containing water to be treated and venting ozone as it reaches the top of the tank. This design produces little effective ozone-water contact.

U.S. Pat. No. 4,141,830 (Last) teaches an ozone/ultraviolet water purifier wherein ozone is generated in a tubular chamber from which it enters the bottom of a water column and flows upwards along with upwards flowing water. This design, in addition to being tall, is inefficient in that it does not even take advantage of a counter-current flow mechanism to amplify the effective ozone-water contact time.

U.S. Pat. No. 5,266,215 (Engelhard) and U.S. Pat. No. 5,540,848 (Engelhard) teach a compact but inefficient water purification unit, wherein an ozone generator may be incorporated to entrain ozone along with inflowing water. Since the ozone flows along with water rather than counter-current, and since the contact column is short, the ozone-water contact is not optimal.

U.S. Pat. No. 5,674,312 (Mazzei) teaches an apparatus and process for injecting high concentrations of a treatment gas into a liquid stream which is devoid of undissolved gas or a gas phase. The liquid stream is passed through a gas inducing injector to receive treatment gas, and then is passed through a centrifugal liquid/gas separator from which entrained gases and liquid with dissolved treatment gases are separately withdrawn. Although the conduit in which gas injection into the liquid stream occurs is indicated to have a length selected to provide enough residence time for the intended liquid/gas exchange to occur, contact time is relatively short, the gas travels along with the liquid and not in counter-current manner, and unused gas must be withdrawn, which evidences that the ozone-water contact is in need of improvement.

U.S. Pat. No. 4,123,800 (Mazzei) teaches an injector-mixer in which the contact chamber is extremely small, and in which the residency time is short.

There is thus a need for a device which optimizes ozone-water contact, which is compact and efficient, and which does not impede the flow of water.

SUMMARY OF THE INVENTION

It is an object of the invention to provide a contact chamber which is self-regulating, and in which ozone achieves optimal mixing and dissolution in water.

It is a further object of the invention to provide a mixing chamber that is simple in design, can be assembled from conventional parts, and is highly effective.

Broadly, these and other objects of the present invention have been accomplished by an ozone contact chamber utilizing the principle of laminar stratification of gas in a turbulent contact chamber. The resulting contact chamber is much shorter than the conventional tower contact chamber, and ensures a high degree of dissolution of ozone in water and, consequently, a high degree of oxidation of organic and metal impurities to a final oxidation state.

The present invention uses a contact chamber wherein ozone-containing water is injected generally horizontally and tangentially at or near the upper end of the chamber.

Depending upon the amount of gas accumulated in the upper end of the chamber, the injected ozone-containing water may fall slightly through a reservoir of ozone which collects near the top of the chamber before tangentially hitting turbulent swirling water which fills most of the chamber. The tangential impact of the injected water, together with the large number of bubbles present in the water, results in a turbulent swirling motion of the water. An outlet pipe extends into the chamber and has an inlet opening near the bottom of the chamber. Due to the splashing and the swirling movement, the ozone achieves an excellent contacted with the water.

Further, due to the location of the ozone-laden water inlet at the top of the chamber and the location of the contact chamber outlet at or near the bottom of the chamber (which is contrary to the conventional design), ozone bubbles tend to form a laminar stratification in the contact chamber. That is, the larger bubbles tend to gravitate towards the top of the tank, where they are acted upon and broken down by the impact of the injected ozone-laden water. The finer the bubbles, the lower the buoyancy of the bubbles, and the greater the likelihood that the bubbles will be entrained in the downward-and-outward flowing water and migrate toward the bottom of the tank and ultimately leave the tank in the form of super-fine bubbles or completely dissolved ozone. Thus, a laminar stratification is formed, with larger bubbles having greater buoyancy and collecting near the top of the contact chamber, with decreasing diameter bubbles with increasing depth in the contact chamber, and finally with super fine bubbles or dissolved ozone at or near the bottom of the tank.

Obviously, utilization of the ozone is optimized, since large bubbles tend to remain in the contact chamber until broken down, and only fine bubbles or completely dissolved ozone tends to leave the contact chamber. As a consequence, as the water to be treated enters the contact chamber and flows downwards through the laminar stratifications and into layers with ever-finer bubbles, and finally leaves the contact chamber, organics and metals tend to be exposed to super fine or dissolved ozone and to be completely oxidized. It is surprising that this superior effect is achieved in a system which is contrary to the conventional tall column contact chamber wherein ozone bubbles are introduced into the bottom of the tank and percolate upwards. It is also surprising that superior contact time can be achieved in a contact chamber which is not long and slender, but rather is short and wide.

The present invention thus provides advantages which would be expected to be associated with a tall column contact chamber but without the space requirement, and provides the advantages which would be expected to be found in a long spiral tube contact chamber, but without the disadvantageous pressure drop between water inlet and exit.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a fuller understanding of the nature and objects of the present invention reference should be made by the following detailed description taken in with the accompanying drawings in which:

FIG. 1 is a perspective representation of the inside of the ozone contact chamber of the present invention, showing the tangential inlet, clockwise turbulent swirling, and laminar stratification of bubbles.

DETAILED DESCRIPTION OF THE INVENTION

Ozonation in accordance with the present invention can be used in numerous applications, such as swimming pool, water fountain, pond, and aquatic mammal tank water purification; treatment of large aquariums of 20 gallon or greater capacity; industrial carpet cleaning water purification; car wash water purification; industrial plant equipment wash water recycling and purification; wastewater purification, etc.

As discussed above, the ozonation process can be broken down into two steps: (1) production of ozone in the form of a gas, and (2) contacting water with the ozone gas for a time sufficient to achieve oxidation of organics and metals present in the water. The process of ozone production, though not considered a part of the present invention, will be discussed first.

Ozone Production

Ozone can be produced by passing oxygen through the space between two electrodes which conduct high voltage current in ozone generator. A dielectric insulating material causes a breakdown of the current in the space between an inner electrode and an outer electrode. This breakdown of the current between the electrodes produces a corona electron field of high energy. As oxygen passes through this corona field, oxygen molecules attract addition electrons, causing the oxygen molecules to disassociate and form separate oxygen atoms. Some of these free oxygen atoms will recombine to form ozone; three oxygen atoms with three electrons.

Conventional electrodes used in corona-discharge ozone generators use a solid conductive material to form and inner electrode spaced from an outer electrode. To avoid excessive resistance heating, the electrode sizes must be increased for high current applications. Improved performance can be obtained by using a perforated or grill-like outer electrode, with a fan or the like to blow cooling air over the electrodes. The inner electrode is preferably is a quartz-glass vacuum tube containing a gas vapor which acts as the conductor-electrode, with the quartz glass wall of the vacuum tube acting as the dielectric insulator. The conductive vapor molecules inside the vacuum tube form a "bridge" which conducts high voltage current over the entire interior surface of the inner electrode, providing a much large surface area than the surface area which is normally available on a continuous solid conductor tube or flat-plate surface used as an inner electrode in conventional corona-discharge generators.

A motorized veriac transformer may be used to adjust the current to the high-voltage transformer supplying the ozone generator so that the amount of ozone produced may be increased or decreased. The veriac transformer may be manually adjusted or automatically controlled by controller.

Ozone may also be generated through ultraviolet irradiation of air within a housing. It is well known that ultraviolet radiation in air will alter the molecular structure of oxygen ($O_2$), to produce ozone ($O_3$). Ultraviolet light located in an air environment or air space within a tube will convert some of the oxygen molecules in the air space between the light and the tube to ozone molecules.

Corona discharge type ozone generators are generally preferred in view of efficiency and reliability. U.S. Pat. No. 5,855,856 (Karlson) teaches an ozone generating apparatus that includes an ozone generator having concentric electrodes and a means for generating a corona discharge between the electrodes, a pump for recirculating a portion of the ozone-containing gas leaving the generator through a conduit which is configured to receive a portion of the ozone containing gas, and a heat exchanger for cooling the recirculated portion of the ozone-containing gas. An oxygen-containing gas is also introduced to the heat exchanger and combined with the recirculated gas portion to form a feed gas which is chilled in the heat exchanger and then introduced into the generator. See also U.S. Pat. No. 5,766,560 (Cole).

The water containing ozone (and usually oxygen, which may be in the form of substantially pure oxygen, air or other suitable mixture of gases that includes oxygen) is then conveyed to the contact chamber according to the present invention.

Contact Chamber

An exemplary contact chamber will be described by reference to the embodiment shown in FIG. 1. The present invention uses a contact chamber which is basically a large empty container of anywhere from about 1 to 100 gallon capacity, preferably 5 to 50 gallons, and more preferably 10–30 gallons. The minimum diameter of the chamber would be about 4 inches. The minimum height of the chamber would be about 10 inches.

As an example, considering the water flow rates encountered in treatment of a conventional domestic swimming pool, a 10–12 gallon chamber with an 8 inch diameter and 20–24 inch height would be sufficient. The chamber may be made of any material having resistance to ozone, and for reasons of low cost and ready availability, PVC is preferred. The chamber may be any shape, but a featureless barrel shape having a smooth circular inner wall is preferred in order not to interfere with a swirling motion introduced by the injected ozone laden water into the contained liquid.

Ozone-laden water obtained as discussed above is injected through inlet pipe 2 preferably tangentially near the upper end of the chamber, and in the case that gaseous ozone collects at the top of the chamber, may fall slightly through the reservoir of ozone which collects near the top of the chamber before tangentially hitting the water which fills most of the chamber. The injected water imparts a turbulence and swirling motion 3 to the reservoir water upon striking the surface of the water. Obviously, as larger bubbles 4 tend to congregate near the top of the chamber, the injected water is effectively employed in impacting and breaking up the larger bubbles. Finer bubbles 5 tend not to resist the downward flow of water, and thus tend to move downwards. The result is a laminar stratification of bubbles, with larger bubbles 4 near the top of the chamber, ever finer bubbles going deeper into the chamber, and ultra fine bubbles 6 or completely dissolved gas at the very bottom of the chamber.

A contact chamber outlet pipe 7 extends into the chamber and has an inlet opening 8 near the bottom of the chamber. Due to the splashing, the swirling movement, and the large volume of the contact chamber, the ozone has a high residency time, does not leave the chamber until it is micronized or dissolved, and is well contacted with the water. As a result of the positioning of the ozone-laden water inlet at the top of the chamber and outlet at the bottom of the chamber (which is contrary to the conventional design), ozone bubbles tend not to leave the chamber until they are broken up and reduced to a fine size or dissolved, ensuring that the ozone is completely available to oxidize organic matter and metals in the water being treated.

In the case that a significant amount of ozone, oxygen and/or air accumulate at the top of the chamber, the greater will be the tendency for large bubbles to be entrained in the water and be forced out the contact chamber outlet pipe 7. Thus, an equilibrium will be established as to the amount of the ozone gas forming a layer at the top of the chamber, it becomes impossible for too much ozone to accumulate in the contact chamber, and no manual adjustment or control is required.

It is a feature of the present invention that organic matter, such as algae, hair, bacteria, etc., can be completely oxidized. This complete oxidation may occur in one pass, but in certain applications more than one pass of the water being treated through this type of contact chamber will be required. This differs from the prior art, where ozone contact was less effective and oxidization resulted in inactivation of bacteria and partial break-down of organic matter, but not complete oxidization of carbon-based material to the final state—carbon dioxide. In the present invention the ozone in the liquid stream can cause organic matter and metals to be completely oxidized.

Illustrative Embodiment

The invention will now be described using as an example the ozone contacting chamber shown in FIG. 1 which is designed for use in a system designed for treating a swimming pool, but could equally well be used in treating hot tub or fountain water with sizes of 1900 liters (500 gallons) and up.

Pool water traveling through a pipe enters a venturi which draws ozone in from an ozone generator as discussed above. The ozone laden water proceeds through a pipe 2 of no less than ½ inch and no greater than 3 inches internal diameter, and 1 inch in the example, to enter the contact chamber 1 having a diameter of 8 inches and a height of 20–24 inches. The contact chamber can be constructed by capping the ends of a pipe having the desired diameter and length. Contact chambers for use in purification of hot tub water would have the same dimensions, considering the need to dissipate heat. The pipe 2 entering the contact chamber 1 is elbowed after passing through the chamber top to provide a horizontal and tangential outlet into the contact chamber and thereby aid in imparting turbulence and a swirling motion to the water and ozone in the chamber. The chamber and pipes are made of conventional PVC materials.

The ozone introduced upstream through the venturi is entrained by water flow and enters the contact chamber through pipe 2, which can be formed by a pipe with an outlet located from one quarter to one inch from the side wall of the chamber, wherein the inlet pipe is approximately parallel to the nearest side wall. Ozone gas bubbles of various sizes are formed in the chamber, with larger bubbles having greater lift and accumulating in the upper end of the contact chamber 1. At the same time the water, which is continuously agitated and churning, breaks up and pushes down gas bubbles within the water in the chamber. A laminar stratification of gas bubbles results, with larger bubbles 4 collecting near the upper end of the chamber and smaller bubbles 5, 6 being entrained in the water flow and moving downwards towards the bottom of the contact chamber. Due to the turbulence to which bubbles are subjected to over and over again, bubble sizes are reduced to a minimum and the gas-water liquid interface is overcome, allowing for maximum dissolution of ozone into the water.

Water is drawn from the bottom of the chamber through outlet pipe 7 which can be formed by cutting the outlet pipe at an angle of from 0 to 60° from the perpendicular. Pipe 7 preferably extends upwards along the central axis of the contact chamber as shown in FIG. 1, first so as not to interfere with the swirling of the water within the reaction chamber and in fact to help direct the swirling of the water, and second, to permit the contact chamber to rest on the ground without pipes protruding from underneath the chamber. The outlet pipe could, as just mentioned, extend downward through the bottom of the chamber, but this would be associated with the problem that the chamber could no longer rest on its bottom end-cap, thus requiring a stand. Finally, the outlet pipe could extend through the side wall of the contact chamber, but this would be associated with a disadvantageous impeding of the swirling motion of the water within the contact chamber.

As the water is drawn from the bottom of the chamber through pipe 7 a redox increase can be seen of 600 millivolts or more, preferably 650 millivolts or more, and as much as 850 millivolts, with this process. This extensive and unique contacting process has never been applied in process for purifying water for swimming pools, thus ozone has never been able to be dissolved adequately in water. A 3 to 5 lb. pressure drop was achieved for this to work properly in the example. It was found that the contact chamber for ozone must be no less than 20 to 24 inches tall at a water flow of approximately 20–75 gallons per minute with an outer diameter of no less than 8 inches for this flow rate.

A increase of 4–12 inches in height should accompany flow rates of 10 gallons a minute increments above the 50 gallons per minute in order to maintain proper dissolution of ozone in the water and also to obtain and hold a redox potential in excess of 600 millivolts, preferably 650–850 millivolts. The inlet 8 of the exit pipe 7 should be at least ½ but no more than 2 inches off the bottom of the floor contact chamber floor.

The result of the orchestration of the bubble traffic and the flow direction and residency time of the water, the contact time between the ozone and water is effectively increased, and the ozone is dissolved in the water to a great extent, resulting in a high degree or even complete oxidation of organic material in the water. In the preferred embodiment, at least 30 to 90% of the organic material is completely oxidized before leaving the enclosed space. This is a significant feature of the present invention. The method can be repeated two or more times in two or more sequential contacting chambers.

Although this invention has been described in its preferred form with a certain degree of particularity with respect to a contact chamber for ozone in a swimming pool water purification system, it is understood that the present disclosure of the preferred form has been made only by way of example, and that numerous changes in the details of structures and processes may be resorted to without departing from the spirit and scope of the invention. Further examples of water treatment processes include industrial carpet cleaning water purification, car wash water purification, industrial plant equipment wash water recycling and purification, wastewater purification, etc.

What is claimed is:

1. A method for contacting ozone and water, said method comprising:

providing a contacting chamber for contacting ozone and water, said chamber having a central vertical axis and defining an enclosed space and having a top, a bottom, and at least one side wall, and further having an inlet and an outlet, wherein said inlet is within the top quarter of said enclosed space, said outlet is within 2 inches of said bottom, injecting an ozone and water mixture into said enclosed space through said inlet and tangential to said central axis to impart turbulence and a swirling motion that continuously agitates and churns said ozone and water contained within said enclosed space, and withdrawing a highly mixed ozone and water mixture via said outlet, wherein said ozone generally forms a laminar stratification within said enclosed space, with larger bubbles forming upper strata and progressively finer bubbles forming progressively lower layers, and wherein said inlet is elbowed after passing through the chamber top to provide a horizontal and tangential outlet into said contacting chamber to impart said turbulence and swirling motion.

2. A method as in claim 1, wherein said enclosed space has a capacity of from 1 to 100 gallons.

3. A method as in claim 1, wherein said enclosed space has a capacity of from 5 to 50 gallons.

4. A method as in claim 1, wherein said enclosed space has a capacity of from 10 to 30 gallons.

5. A method as in claim 1, wherein said enclosed space has a height of at least 10 inches.

6. A method as in claim 1, wherein said enclosed space has a diameter of at least 4 inches.

7. A method as in claim 1, wherein said enclosed space is generally cylindrical.

8. A method as in claim 1, wherein said enclosed space is generally barrel shaped.

9. A method as in claim 1, wherein organic material is introduced into said enclosed space along with said water and ozone, and wherein at least 30% of said organic material is completely oxidized before leaving said enclosed space.

10. A method as in claim 9, wherein at least 50% of said organic material is completely oxidized before leaving said enclosed space.

11. A method as in claim 9, wherein at least 75% of said organic material is completely oxidized before leaving said enclosed space.

12. A method as in claim 9, wherein at least 90% of said organic material is completely oxidized before leaving said enclosed space.

13. A method as in claim 1, wherein the redox potential measured at the outlet of the contact chamber is in excess of 600 millivolts.

14. A method as in claim 1, wherein the redox potential measured at the outlet of the contact chamber is in the range of 650 to 850 millivolts.

15. A method as in claim 1, wherein said enclosed space is generally cylindrical, wherein said outlet is formed by a pipe which has an inlet from one half to two inches above said bottom, said pipe extending along said vertical axis exiting said enclosed space through the center of the top of said cylinder.

16. A method as in claim 15, wherein said outlet is formed by cutting the outlet pipe at an angle of from 0 to 60° from perpendicular.

17. A method as in claim 1, wherein said enclosed space is generally cylindrical, wherein said inlet is formed by a pipe with an outlet located from one quarter to one inch from said side wall, and wherein said inlet is approximately parallel to the nearest side wall.

18. A method as in claim 1, wherein said method is repeated two or more times in two or more sequential contacting chambers.

* * * * *